United States Patent
Bangert, Jr.

[11] 3,769,549
[45] Oct. 30, 1973

[54] ELECTRICAL FIRE AND SHOCK PROTECTIVE APPARATUS

[75] Inventor: Charles Bangert, Jr., West Hartford, Conn.

[73] Assignee: General Electric Company, New York, N.Y.

[22] Filed: Aug. 7, 1972

[21] Appl. No.: 278,246

[52] U.S. Cl..................... 317/18 A, 317/45, 335/18
[51] Int. Cl............................................. H02h 3/28
[58] Field of Search.................. 317/45, 18 A, 18 C, 317/18 D; 335/18

[56] References Cited
UNITED STATES PATENTS

| | | | |
|---|---|---|---|
| 3,320,480 | 5/1967 | Failor | 317/18 D |
| 3,636,482 | 1/1972 | Edmunds | 317/18 D |
| 3,493,815 | 2/1970 | Hurtle | 317/45 X |
| 3,252,052 | 5/1966 | Nash | 317/18 D |
| 1,337,866 | 4/1920 | Whitaker | 317/45 |

Primary Examiner—James D. Trammell
Attorney—Robert T. Casey et al.

[57] ABSTRACT

Electrical protective apparatus for the prevention of electrical fires as well as protection against injury to people by electric shock, including a two-conductor flexible "extension cord" having at least one conductor thereof completely surrounded by a flexible conductive sheath insulated from the main conductors and preferably covered with an outer layer of insulating material. An automatic circuit interrupting device is connected between one of the two main conductors and the "high" or ungrounded side of a source of electric power. The other conductor is connected to the grounded side of the source. The conductive sheath is also connected to the grounded side of the power source by a third conductor.

In case of wear or damage to the extension cord, or deterioration of its insulation due to excessive heat, the two main conductors cannot come in contact with each other without at least one of them coming in contact with the conductive sheath. This causes some current to be diverted from at least one of the main conductors and to flow through the sheath and the third conductor, to ground.

The circuit interrupting device includes means which is responsive to the diversion of a small amount of current (such as 5 milliamperes) from either of the main conductors of the extension cord to the conductive sheath and the third conductor and causes automatic opening of the circuit breaker when this occurs.

10 Claims, 8 Drawing Figures ns="3,769,549"

ELECTRICAL FIRE AND SHOCK PROTECTIVE APPARATUS

FIELD OF THE INVENTION

The present invention relates to electrical protective apparatus, and particularly to apparatus for protecting against the occurrence of fires due to defects in or damage to electrical wiring and as well as for protecting against injury to human beings by electrical shock as provided by prior systems.

BACKGROUND OF THE INVENTION

It is well known that a large percentage of fires in homes, commercial buildings, etc., which are due to electrical causes are caused by misuse, abuse, or damage to electrical conductors, and especially to flexible electrical cords known popularly as "extension cords" which lead from wall type "convenience outlet" sockets, to lamps, small appliances, etc. For example, if the insulation of such extension cords deteriorates due to excessive heat (whether generated by excess current in the cord or by some other cause) or becomes worn or damaged, the conductors carrying the electric current may come in contact with each other and cause a "sparking" short circuit or fault condition which can start a fire by igniting the insulation material of the cord itself or by igniting closely adjacent material, such as rugs, curtains, woodwork, etc. Electrical protective devices, such as circuit breakers and fuses, which have been available heretofore have not been adapted to protect against such occurrences. This is because such prior art protective devices normally operate only in response to current values which are beyond the amount which the conductors are rated to carry whereas the current in such a "sparking" short circuit may well be below such value. Prior art circuit breakers, for example, commonly include "inverse-time" current responsive devices such as bimetallic strips, and/or direct-acting current responsive devices such as solenoids or electro-magnetic trip means, both of which require the passage of current substantially in excess of the rated current of the circuit in order to operate. This is due to the fact that the basic purpose of such protective devices is to protect the wiring of the circuit from heating due to excess current, while permitting the normal current required by the electrical devices which are fed by such wiring to pass. Thus if the wiring from the circuit breaker location to the location of "convenience" outlet boxes or recepticles is rated at 15 amperes, then the circuit breaker will not trip under any circumstances so long as the current through it does not exceed 15 amperes.

Recently, circuit breakers of the type described above have also been provided with means to protect against another type of electrical malfunctioning, known as "ground faults." A "ground fault" is an abnormal condition by reason of which current flows from one of the supply conductors to a grounded object, returning to the source by a return circuit path which does not include, or only partly includes, the normal return wire of the circuit. Such ground fault protective means operates upon the occurrence of a ground fault, even though the total current being drawn is less than the normal current carrying rating of the circuit breaker. In one form, such ground fault protective devices have been made especially beneficial since, by use of solid state electronic technology, they have been made capable of operating in response to extremely minute ground fault currents, such for example as in the neighborhood of 5 milliamperes. They are therefore capable of protecting a human being against injury by electric shock if he comes in contact with the "high" or ungrounded side of an electric circuit while another part of his body is in contact with a grounded object. A circuit breaker which includes all of the aforementioned protective features, including inverse-time overcurrent responsive means, direct-acting overcurrent responsive means, and sensitive ground fault protection means, is shown and described in application Ser. No. 171,770 filed Aug. 13, 1971 by C. F. Hobson and H. M. Dimond and assigned to the same assignee as the present invention.

While the addition of such sensitive ground fault protection provides the important advantages described of guarding against injury by electric shock to human beings, and also of providing an increased measure of protection against fires which may be started by ground fault conditions, it does not provide protection against the "sparking" inter-conductor type of fault described above. It should also be noted that the common "extension cord" is usually located a substantial distance from the associated electric circuit protective device. The impedence of the conductors involved is such that, even on the occurrence of a "dead short" condition, such impedance may limit the flow of current to a value below that which would cause conventional prior art circuit breakers to operate. U.S. Pat. no. 3,493,815, R. L. Hurtle, Feb. 3, 1970, assigned to the same assignee as the present invention, discloses a protective circuit in which a two-conductor cord has each conductor surrounded by a conductive sheath which is electrically connected to the frame or housing of a load. The sheath is also connected to the gate electrode of a silicon controlled rectifier (SCR) which is connected across the line. In the case of an abnormal condition such as might cause the high side of the line to come in contact with the shield or with the housing of the load, this causes the SCR to be turned on. Since it is connected across the line, the SCR acts as a short-circuit or "crowbar" across the line, drawing enough current to trip a circuit breaker or to blow a fuse which is in series with the high side of the line.

In the Hurtle patent structure, the conductive sheath is not normally connected to ground. It cannot, therefore, serve as an equipment grounding conductor or "third wire," which is desirable, and which, in fact, is now required by electrical safety codes. In addition, the Hurtle patent circuit operates by "crowbarring" or short-circuiting the line. For some purposes this is considered to be undesirable, since it draws a heavy current through the conductors as well as through the circuit breaker.

OBJECTS OF THE INVENTION

It is an object of the present invention to provide electrical protective appratus which will provide protection against the starting of fires by defects in flexible extension cords which are such as may cause the power carrying conductors of the cord to come in contact with each other in such a way as to cause a "sparking short" condition.

It is another object of the invention to provide electrical protective apparatus of the type described which optionally permits use of presently existing electrical protective devices which include sensitive ground fault responsive tripping means.

It is another object of the invention to provide electrical protective apparatus of the type described which is compatible with prior art protective apparatus and makes use of prior art overcurrent protective and ground fault protective means and panel assemblies.

SUMMARY OF THE INVENTION

In accordance with the invention, an electrical protective system is provided for use with branch circuit wiring which includes, in addition to the two main current carrying conductors leading from the point of entry of power to a building to a power outlet such as a convenience socket, a third or "equipment grounding" conductor, which is connected to the neutral or grounded conductor adjacent the point of entry of power. In addition, an extension cord is provided comprising two main current carrying conductors, each provided with a covering of suitable insulating material and each surrounded by a continuous flexible electrically conductive shield, the shields being electrically connected together preferably all along the length thereof to form a single conductor. The shield is connected to a third prong of the extension cord connecting plug, so that when the plug is inserted in its socket, the shield is connected to the third or "equipment grounding" wire referred to above. At the remote end of the extension cord, adjacent the power consuming appliance or "load," the conductive shield is preferably but not necessarily connected to any non-current-carrying metallic parts of the power-consuming device or load which are normally exposed, such, for example, as the metallic housing of the power consuming device.

In addition, in accordance with the invention, a circuit protective device is provided, preferably at the point of entry of power, which includes means for detecting the diversion of even a small amount of current, from either one of the main power supply conductors into the shield and third conductor.

In operation, if damage of any kind occurs to the extension cord, such as by wearing, cutting, or deterioration of insulation, etc., it is virtually impossible for the two power carrying conductors to come in contact with each other so as to cause a sparking fault without at least one of the main conductors first contacting the shield. Also, it is ordinarily not possible for the cord to be damaged in such a way as to expose one of the main conductors and to create a shock or hazard, without at least one of the main conductors contacting the shield and causing tripping.

In one form of the invention a current unbalance detecting means, such as a differential transformer, is provided, which generates a signal causing tripping of the breaker. A particularly useful combination is provided by utilizing a differential transformer and tripping means which responds to a current differential of 5 milliamperes or more. By this means human shock protection may be provided in addition to protection against fires.

In another form of the invention, current monitoring means is provided, such as a current transformer, which senses the presence of current in the conductive shield or in the third conductor and which causes tripping of the circuit breaker and opening of the circuit.

Regardless of which conductor contacts the shield, some current will be diverted into the shield, thereby causing tripping of the protective device. This prevents the occurrence of a fire, since not enough current is permitted to flow prior to tripping of the circuit breaker to cause a fire.

In another form of the invention, in addition to the shielded extension cord, the conductors extending between the outlet box and the power source terminals also comprise a two-conductor cable and a double-conductor shield which provides a similar protective function for the cable. In addition, this shield, or this shield plus the extension cord shield, acts as the "equipment ground" or "third wire" now required by safety codes.

In still another form, a protective device or circuit breaker having a simplified form, may be located within the outlet box or receptacle, housing the socket to which the cord is connected.

In all forms of the invention, the shield referred to may, if desired, comprise a conductive shield around only one of the main conductors. If the system is grounded, the shield would be provided around the ungrounded conductor and connecting plugs would be utilized which are "polarized," and assure that the proper conductor of the extension cord is connected to the grounded conductor of the socket. If the circuit involved uses three power supply conductors, such as "A," "B," and "Neutral," the shield may surround each conductor individually or it may surround each of the "A" and "B" conductors only.

DESCRIPTION OF A PREFERRED EMBODIMENT

Figure 1:
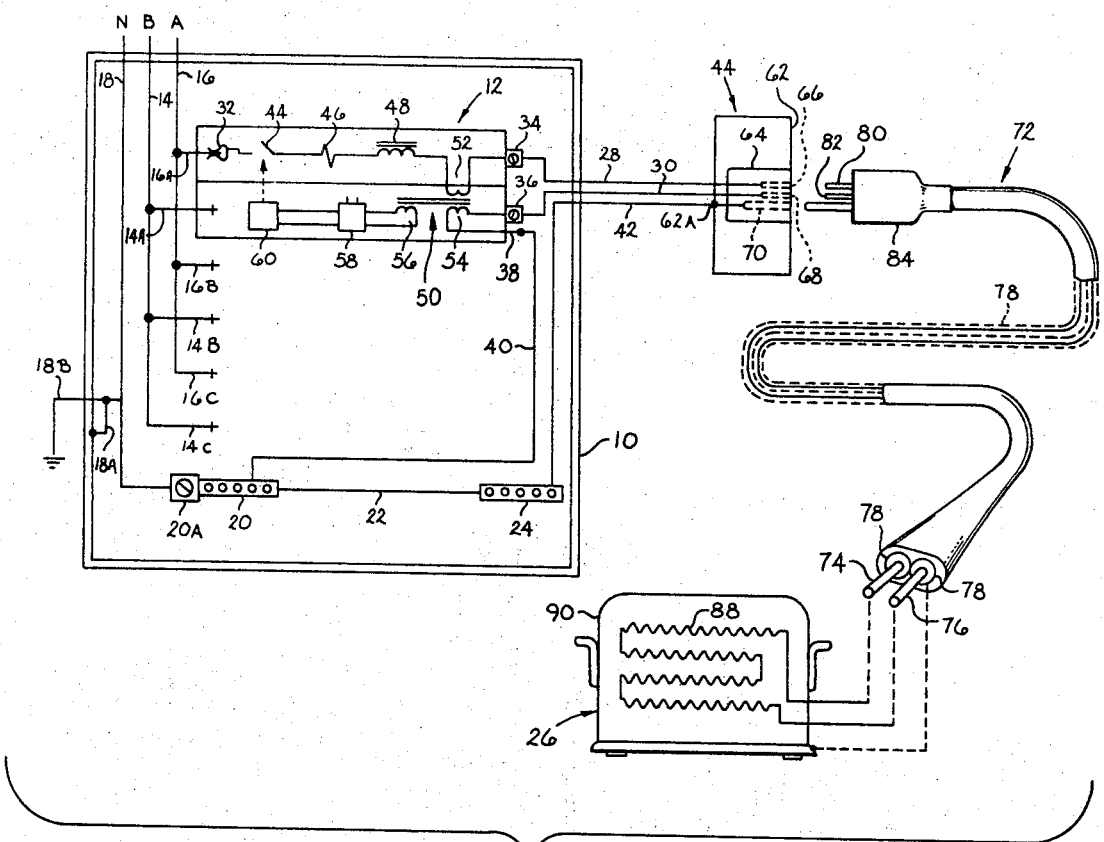
FIG. 1 is a semi-schematic illustration of electrical protective apparatus incorporating the invention in one form.

Referring to the drawings, the invention is shown in FIG. 1 as embodied in electrical protective apparatus including a generally rectangular metallic box 10. An electric protective device or "circuit breaker" 12 is supported in the enclosure 10. Although only a single circuit breaker 12 is shown in FIG. 1, it will be understood that the enclosure 10, in the usual installation such as in a home or othr building, may include any desired number, such as from 1 to 42 or more circuit breakers of varying forms. Such a box 10, together with its circuit protective devices or circuit breakers, is commonly referred to in the trade as a "load center" or "panelboard." The particular number of circuit breakers, as well as the trade-recognized differences between a "load center" and a "panelboard," are not significant to the present invention, and such differences will not be discussed here. Likewise, the specific number, nature and arrangement of bus bar conductors (to be described) and the means for mounting the circuit brakers in place and making contact with such circuit breakers, are not critical to the present invention. For specific details of construction of examples of such load centers and panelboards, however, reference may be made to the following patents:

| Patent No. | Inventor | Issued |
|---|---|---|
| 2,738,446 | W.J. Fleming | March 14, 1967 |
| 3,411,042 | K.W. Klein | Nov. 12, 1968 |
| 3,288,965 | K.W. Klein | Nov. 29, 1966 |
| 3,488,610 | D.B. Powell | Jan. 6, 1970 | all assigned to the same assignee as the present invention.

The form and arrangement of such load centers and panelboards are virtually limitless in variety, and it should be understood that the present invention is not restricted to use of any particular structure of such load centers or panelboards.

Also supported in the enclosure 10, are two main conductor members in the form of power bus bars 14 and 16, and a neutral conductor member 18. In the usual installation, the bus bars 14 and 16 are connected to an externally located power source such as a power transformer (not shown), such as to the opposite ends of a secondary or output winding of such transformer, while the conductor 18 is connected to a center tap of such winding. Thus in a typical installation in the United States, the bus bars 14, 16 may have a 220-volt, 60 hz potential between them, while the potential between each of the bus bars 14, 16, and the neutral conductor 18 would be 110-volts 60 hz. In certain installations, only one bus bar 14, 16, may be used, together with the neutral conductor 18. In still other installations, three bus bars (not shown) may be used, connected respectively to the three phases of a three-phase power system, together with a neutral conductor.

Each of the bus bars 14, 16, has contact means, such as 14A, 14B, 14C, and 16A, 16B, 16C, respectively. While "plug-in" type contact means are illustrated in FIG. 1, it will be appreciated that "bolt-on" type contact means may be used if desired. For purposes of simplification, the load center 10 has been shown without a "main" circuit protective device. If used, such device would control the connection of the bus bars 14, 16, to the external power source, in any of various ways well known to the prior art.

The neutral conductor 18 may be connected to the enclosure 10 as shown at 18A, and is further connected to ground, as at 18B. The neutral conductor 18 is connected to a "neutral bar" or terminal strip 20 in the box 10 such as by connector 20A, and the neutral bar 20 is, in turn, connected by a conductor 22 to an equipment grounding strip 24, also supported in the enclosure 10.

The circuit protective device 12 controls power to a remotely located power consuming device or load 26, which in the embodiment illustrated, comprises an electric toaster. For purposes to be described, the circuit breaker 12 not only is connected in series with the "high" or "outgoing" conductor 28 leading to the load 26, but also is connected in series with the "return" conductor 30, although when operating, it operates to interrupt only the "high" or "outgoing" conductor.

The circuit breaker 12 is provided with four terminals. These terminals include an "input" or line terminal 32 which is of the plug-in type and which contacts the contact member 16A of the bus bar 16, and an "output" or load terminal 34 which is connected to the outgoing load conductor 28. A second or load terminal 36 of the breaker 12 is connected to the return load conductor 30. A second "input" or line terminal 38 of the breaker 12, which may comprise a short length of wire or "pigtail," is connected, as by means of conductor 40, to the neutral bar 20. The bus bar 16 and the neutral bar 20 thus form power source terminals, for connection to a source of power, not shown.

The current path as thus far described, therefore is as follows: from the bus bar contact 16A to the terminal 32, to the terminal 34 by means to be described, to the outgoing load conductor 28, to the load 26 by means to be described, to the return conductor 30, to the circuit breaker terminal 36, through the circuit breaker 12 by means to be described to the circuit breaker terminal 38, to the conductor 40, to the neutral bar 20, to neutral conductor 18.

In addition to the outgoing and return load circuit conductors, a third wire 42 is included, to be described more fully, connected to an equipment grounding strip 24 in the box 10.

The circuit protective device or circuit breaker 12 includes a movable contact 44, an inverse-time current responsive trip device 46, and a direct-acting current responsive trip device 48. The term "inverse-time" is used to refer to a current responsive device whose response time varies inversely with the magnitude of current. The most common example of inverse-time current responsive devices is a bimetallic strip. The term "direct-acting" is used to refer to a current responsive device which does not have "inverse-time" characteristics. The most common example of direct-acting current responsive devices is an electro-magnet or solenoid. The circuit breaker 12 also includes a manually operable operating mechanism, not shown, for moving the movable contact 44 between open and closed circuit positions. The operating mechanism includes a normally latched, releasable trip member, not shown, which when released causes the mechanism to move the movable contact to open circuit position, regardless of whether the handle of the operating mechanism is held in the "ON" position manually. The trip devices referred to act on the latch member, which holds the releasable trip member, in a manner well-known to the prior art.

In addition to the inverse-time and direct-acting tripping devices, the circuit breaker 12 includes means for tripping on the occurrence of a ground fault current. For this purpose the circuit breaker 12 includes a differential transformer 50. The transformer 50 has a first winding 52 in series between the terminals 32 and 34, and a second winding 54 between the terminals 36 and 38. The transformer 50 further includes an output or sensing winding 56, connected to an electronic switch 58, which in turn controls a tripping solenoid 60. The electronic switch referred to may be of conventional construction, including a gate-controlled solid-state device such as a silicon-controlled-rectifier. Examples of such switches are included in U.S. Pat. No. 3,619,723, issued Nov. 9, 1971 to J. P. Walden, and 3,657,604, issued Apr. 18, 1972 to H. G. Willard, both assigned to the same assignee as the present invention.

When an unbalance occurs between the currents in the outgoing and return load conductors 28 and 30, a signal appears across the winding 56. This signal triggers an SCR or similar device (not shown) in the electronic switch 58, which causes actuation of the solenoid 60 and tripping of the circuit breaker 12.

A circuit breaker of the type described is shown and described in detail in the aforesaid co-pending application Ser. No. 171,770. The sensitivity of the ground fault trip portion of the circuit breaker 12 is preferably set at about 5 milliamperes to protect persons from injury by electric shock. If this is not a required function, and the protection against fire, as will be described, is the primary object, then the sensitivity of the unbalance detecting means (differential transformer, etc.) may be set much higher, such as 50 milliamperes or more.

The outlet box 44 includes a metallic housing 62 and an insulating body 64 having three sockets 66, 68, 70 connected to the conductors 28, 30, and 42 respectively. The housing 62 is connected to the third wire 42 at 62A.

In accordance with the invention, an extension cord 72 is provided including two main conductors 74, 76, each surrounded by an insulation covering 78A, 78B. Each insulated conductor 74, 76 is encased in a flexible sheath 74A, 76B of conductive material such as woven copper of aluminum wire, or a foil ribbon wrap, the sheaths being connected or in contact with each other all along their length to form in effect a single conductor 746. The cord 72 also preferably includes an outer protective covering 73 of insulating material. The conductors 74 and 76 are connected to prongs 80, 82 respectively of the plug 84. The conductive sheath 746 forms a third conductor which is connected to the prong 86 of the plug 84. At the end of the extension cord remote from the plug 84, the conductors 74, 76, are connected to the power consuming elements such as the heater grid 88 of the device 26. The conductive sheath 746 is also preferably connected to the outer metallic housing 90 of the device 26.

In operation, if the insulation of the extension cord 72 should deteriorate, such as due to excessive heat, or if it should be cut or worn or otherwise damaged, it is practically impossible for the conductors 74, 76 to come in contact with each other without first contacting the conductive sheath 746. When this occurs, some current returns to the neutral bar 20 and the neutral conductor 18 way of the conductive sheath 746, the equipment ground wire 42, the equipment ground strip 24, the conductor 22, and the neutral bar 20. In other words, some of the return current is diverted from at least one of the conductors 28, 30, and by-passes the differential transformer 50 of the circuit breaker 12. This causes an unbalance of currents in the windings 52, 54 and causes a signal to appear across the output winding 56, triggering the electronic switch 58. Triggering of the electronic switch 58 causes actuation of the solenoid 60 and tripping of the circuit breaker 12. Since the trip level of the ground fault portion of the breaker 12 is set very low, such as 5 milliamperes, such current is not sufficient to start a fire. As noted above, however, the trip level could be set substantially higher than 5 ma, and still provide protection against fire.

Figure 3:
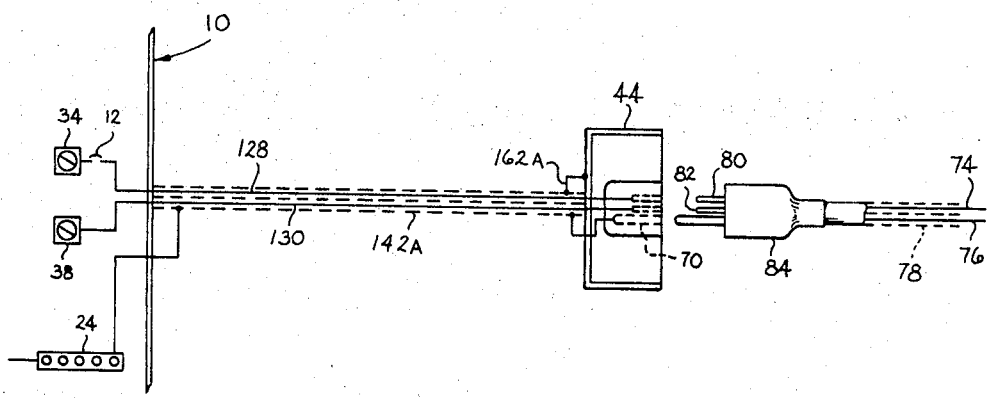
FIG. 3 (sheet Number 2) is a semi-schematic illustration or a portion of an electrical wiring system incorporating the invention in another form.
Figure 6:
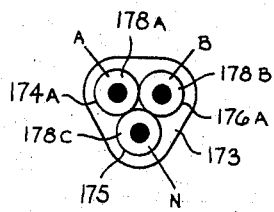
FIGS. 6 and 7 are cross-sectional views of second and third special electrical cables or extension cords in accordance with the invention.
Figure 7:
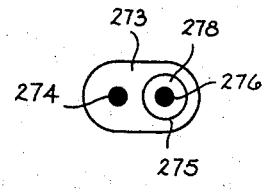

As shown in FIG. 3, in accordance with the invention in another form, the cable interconnecting the panel assembly 10 and the outlet box 44 comprises two conductors 128 and 130, and an electrically conductive flexible sheath 142A surrounding each of the conductors individually throughout the length thereof. At the panel end, the sheath 142A is connected to the grounding terminal strip 24, etc., and at its remote end it is connected to a terminal of the socket 70 and also to the outlet box 44 itself as indicated at 162A. The sheath 142A therefore serves as the grounding wire or "third wire" required by the National Electrical Code, placing the box 44 at ground potential. By this means, the entire circuit between the panel 10 and the power consuming device is protected from faults caused by deterioration of the insulation within the conductor or by physical wear or damage to the conductor.

Figure 4:
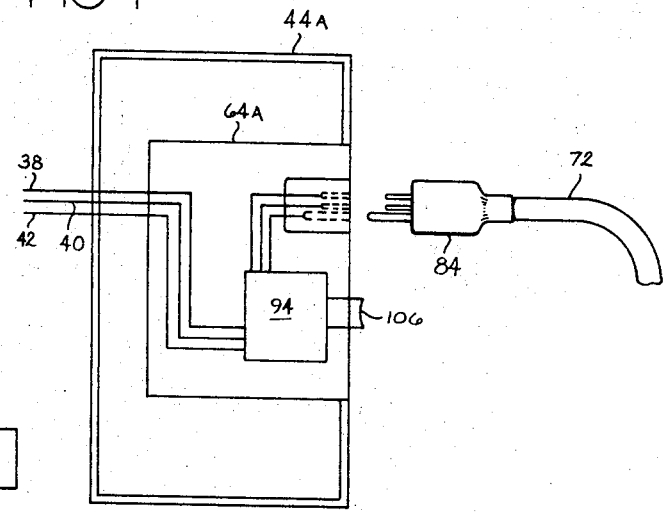
FIG. 4 is a semi-schematic drawing, on enlarged scale, of the "convenience outlet box" portion of another form of the invention.
Figure 5:
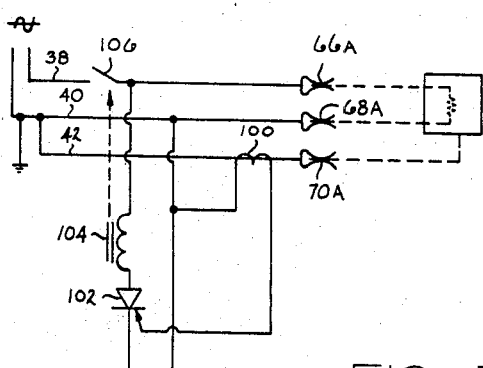
FIG. 5 is a schematic diagram of the circuit connections of the form of the invention of FIG. 4.

Referring to FIG. 4, the invention is shown in another form. In this form, a sensitive current detector, electronic switch, tripping solenoid, and resettable circuit breaker are included within the outlet box 44A, as indicated generally by the box 94. In this form, as shown in FIG. 5, a current transformer 100 is provided which monitors current in the ground wire 42. When a predetermined current appears in this conductor, the SCR 102 is triggered to conducting condition, activating the solenoid 104, which opens contacts 106, in the outgoing side of the line 38. The contacts 106 may, if desired, be operated by a simple form of mechanism, not shown, of the type referred to in the art as a "resettable cut-out" which does not include means for manually opening the contacts, but does include a reset button 106 for reclosing. Of course if desired, a circuit breaker similar to that shown in FIG. 1 may be used.

If desired, means, not shown, may also be included in all forms of the invention for injecting or inducing a voltage in the conductor loop comprising (referring to FIG. 1) the conductor 42, the conductor 22, the conductor 40, winding 54 and conductor 30. This loop is normally not closed, since conductor 30 is not normally in contact with conductor 42 at any point remote from the box 10. If the conductor 30 comes in contact with the box 44 or with the conductor 42 or the sheath 78, however, the loop will be closed, and current will flow, causing tripping of the circuit breaker by creating unbalance in the differential transformer in the form of FIG. 1 or by causing a signal to appear in the current transformer 100 in the form of FIG. 5, 3, and 4. This operation will take place even if the circuit to the load is open at the load.

If desired, of course, the ground fault sensing technique shown in FIG. 1 may be used in the form of the invention shown in FIG. 4. In other words, instead of the current transformer 100 monitoring current in conductor 42, I may use a differential transformer which monitors the currents in the conductors 38 and 40 and which generates a signal when a predetermined difference, such as 5 milliamperes, appears in these currents. If this is done, the third conductor 42 may be electrically connected to the second conductor 40 within the outlet box 44A provided such connection is made on the line or power source side of the differential transformer. Stated in another way, the differential transformer must monitor the currents in the first and second conductors at a point which is on the load or power consuming device side of the point at which the third conductor becomes electrically common with the second conductor.

Also, if desired, I may use the invention as shown in FIG. 4, including the current transformer 100, and also connect the third conductor 42 to the second conductor 40 within the outlet box 44A. In this case, it is only necessary to make sure that the current transformer 100 monitors current only in the third conductor 42.

The forms of the invention described immediately above are of importance since they permit the invention to be used with pre-existing wiring in which only two conductors are provided between the power source such as the panel or load center 10 and the outlet box 44 or 44A. In such cases only a predetermined length of conductor between the power source terminals and the power consuming device (e.g., such as the extension cord) need be of the three-conductor form.

Figure 2:
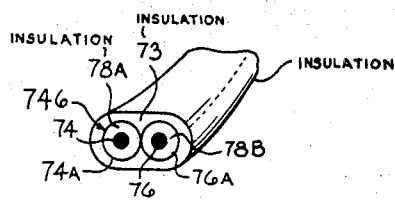
FIG. 2 is a fragmentary illustration showing a segment of the special electrical cable "extension cord" in accordance with the invention.

The sheathed conductor, as illustrated in FIG. 2, is preferably provided with an outer insulating coating 73. The outer insulating coating 73 serves to physically protect the sheath-conductor 746 from abrasion, cutting, and wear. In addition, the insulation portion 73 serves to hold the shielded conductors 74 and 76 in close side-by-side relation, with the sheaths 74A and 76A pressed together in electrically conducting contact at their line of tangency all along their length to form the conductor 746. Furthermore, the insulation portion 73 electrically insulates the sheath 746. This is important, since, in the form of the invention shown in FIGS. 4 and 5, it is desirable to insure that all current which may be diverted from either of the conductors 74, 76 because of failure of the insulation 78 shall be conducted back to the neutral conductor 18 only through the conductive sheath 746. This is because in this form, tripping of the breaker 106 is dependent on the magnitude of current in the conductor 42, which in turn comes from the sheath-conductor 746. If there were no outer insulation covering on this sheath, the sheath might readily come in contact with a grounded object such as a water pipe, radiator, etc. If this occurred, then current from the sheath 746 could device and return to the conductor 18 partly through the sheath 746 and conductor 42, and partly through such water-pipe or radiator and earth ground. This would have the effect of reducing the sensitivity of the system. This, of course, does not apply to the form of the invention shown in FIG. 1, and for this reason this form is in general to be preferred.

Figure 8:
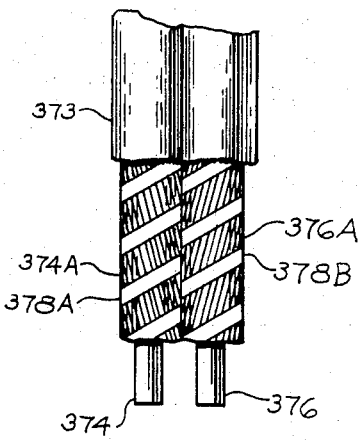
FIG. 8 is a fragmentary view of a modified form of sheathed conductor usable in the invention.

FIG. 8 shows a modified form of sheathed conductor in accordance with the invention. In this form, the "third" or sheath conductor is in the form of two ribbons or strips of thin metal or foil 374A, 374B, overlying the insulation 378A, 378B on the conductors 374, 376.

The wrappings 374A, 374B are made with a small space between turns, the space being lesser in width than the width of the ribbon, and the wrappings are offset so that the spaces do not coincide. No path is therefore available between the conductors which does not encounter a layer of a ribbon.

In the case where only one of the "main" conductors is provided with a shield, (not shown) the ribbon is preferably wrapped with a slight overlap so as to completely surround the conductor, with no cracks.

While only certain embodiments of the invention have been shown and described, it will be appreciated that many modifications may be made, and it is therefore intended by the appended claims to cover all such modifications as fall within the true spirit and scope of the invention.

I claim:

1. Electrical protective apparatus comprising:
   a. a support;
   b. at least first and second terminal members supported on said support for connection to a source of electric power;
   c. an automatic electric circuit interrupting device supported on said support and having an input terminal connected to said first one of said terminal members, and having an output terminal;
   d. conductor means comprising first and second conductors connected to said output terminal of said circuit interrupting device and said second terminal member respectively, said conductor means also comprising a third conductor, said third conductor being in the form of an electrically conductive flexible sheath surrounding at least one of said first and second conductors in insulated relation and including a portion positioned between said first and second conductors;
   e. means separate from said second conductor electrically connecting one end of said third conductor to said second one of said terminal members;
   f. said circuit interrupting device including trip means responsive to current flow in said first and second conductors for detecting the diversion of current from one of said first and second conductors to said third conductor, said trip means being responsive to the diversion of less than one ampere of current to automatically open said circuit interrupting device at high speed whereby the likelihood of a fire being started by said diversion of current is substantially zero.

2. Electrical protective apparatus as set forth in claim 1 wherein said trip means responsive to diversion of current comprises means responsive to an unbalance of currents passing through said first and second conductors for causing automatic opening of said circuit interrupting device.

3. Electrical protective apparatus as set forth in claim 2 wherein said circuit interrupting device also includes means responsive to the magnitude of current passing through said first and second conductors for causing automatic opening of said circuit interrupting device.

4. Electrical protective apparatus as set forth in claim 3 wherein said means responsive to the magnitude of current comprises inverse time current responsive means and direct acting current responsive means.

5. Electrical protective apparatus as set forth in claim 1 wherein at least said conductor means also includes an outer insulating coating covering said conductive sheath.

6. Electrical protective apparatus as set forth in claim 1 wherein said conductive sheath also includes a portion surrounding said second one of said first and second conductors in insulated relation thereto.

7. Electrical protective apparatus as set forth in claim 1 wherein said conductive sheath comprises a first portion surrounding said first one of said first and second conductors in insulated relation and a second portion surrounding said second one of said main conductors in insulated relation and insulation material surrounding and enclosing said first and second portions of said conductive sheath and maintaining said sheath portions in longitudinal contact with each other substantially all along the length thereof.

8. Electrical protective apparatus as set forth in claim 1 wherein said means responsive to the diversion of current from one of said first and second conductors to said third conductor comprises means for detecting the presence of current in said third conductor.

9. Electrical protective apparatus as set forth in claim 1 wherein said conductor means comprises at least in part a flexible extension cord having a three-prong plug at one end in plug-in relation to a three-part socket in an outlet receptacle box and wherein said circuit interrupting device and said means for detecting the diversion of current to said third conductor are also contained in said outlet receptacle box.

10. Electrical protective apparatus as set forth in claim 9 wherein said means connecting one end of said third conductor to said second terminal member comprises a connection between said third conductor and said second conductor within said outlet receptacle box.

* * * * *